United States Patent [19]
Toporkiewicz et al.

[11] Patent Number: 6,084,654
[45] Date of Patent: Jul. 4, 2000

[54] CONVERTIBLE 2-D/3-D PROJECTOR

[75] Inventors: Marian Toporkiewicz, Vorau, Austria; Michael A. Gibbon, Oakville, Canada

[73] Assignee: Imax Corporation, Mississauga, Canada

[21] Appl. No.: 09/106,778

[22] Filed: Jun. 30, 1998

[51] Int. Cl.[7] .................................................. G03B 35/00
[52] U.S. Cl. ............................................. 352/57; 352/59
[58] Field of Search .................................. 348/46, 47, 49, 348/50, 54, 344; 352/57–65, 133, 134, 136, 142, 69, 70, 71, 79, 80, 81, 123, 239; 396/324; 353/7, 101

[56] References Cited

U.S. PATENT DOCUMENTS

| | | | |
|---|---|---|---|
| 1,461,133 | 7/1923 | Marten | 353/82 |
| 1,840,861 | 1/1932 | Walker | 352/44 |
| 2,329,294 | 9/1943 | Ramsdell | 353/8 |
| 3,425,775 | 2/1969 | Jacobsen | 352/57 |
| 3,494,524 | 2/1970 | Jones | 226/4 |
| 3,600,073 | 8/1971 | Shaw | 352/184 |
| 4,168,885 | 9/1979 | Kent et al. | 352/129 |
| 4,365,877 | 12/1982 | Shaw | 352/184 |
| 4,603,952 | 8/1986 | Sybenga | 352/65 |
| 4,966,454 | 10/1990 | Toporkiewicz | 352/59 |
| 4,993,828 | 2/1991 | Shaw et al. | 352/59 |
| 5,148,239 | 9/1992 | Magnussen et al. | 356/435 |
| 5,867,309 | 2/1999 | Spink et al. | 359/377 |

*Primary Examiner*—Alan A. Matthews
*Assistant Examiner*—Rodney Fuller
*Attorney, Agent, or Firm*—Bereskin & Parr

[57] ABSTRACT

A rolling loop motion picture projector is convertible for projecting images either from a 2-D film strip or from a 3-D film strip. The film is advanced through the same incremental amount irrespective of whether a 2-D film of a 3-D film is being projected. The projector has a single central aperture for projecting 2-D images and respective 3-D images on opposite sides of the central aperture. The images on the 3-D film strip are anamorphically compressed in the direction of film travel by a factor of two and the 3-D apertures are correspondingly sized. Projection lenses associated with the 3-D apertures decompress the images so that images of comparable size appear on the screen irrespective of whether a 2-D film or a 3-D film is being shown.

10 Claims, 10 Drawing Sheets

CONVERTIBLE 2-D/3-D PROJECTOR

FIELD OF THE INVENTION

This invention relates to so-called "rolling loop" motion picture film projectors.

BACKGROUND OF THE INVENTION

The principles of a rolling loop motion picture projector are well known and are disclosed, for example, in U.S. Pat. No. 3,494,524 (Jones) and U.S. Pat. No. 3,600,073 (Shaw), the disclosures of which are hereby incorporated by reference. Briefly, the expression "rolling loop" refers to a film transport mechanism which includes a stator and a rotor that together define a film path. The rotor is rotatable with respect to the stator and has gaps in which loops of film are progressively formed and then decay as the rotor rotates for advancing film past an aperture location. Rolling loop motion picture projectors are available commercially from Imax Corporation of Mississauga, Ontario, Canada.

IMAX™ rolling loop projectors are used for showing both 2-D and 3-D films. Two projectors typically are used for 3-D presentations, one for projecting "left-eye" images and the other for projecting corresponding "right-eye" images. The images may be separated using mutually extinguishing polarizers, in which case audience members wear glasses with correspondingly polarized lenses so that the viewer's left eye sees only left-eye images and the viewer's right eye sees only right-eye images.

An alternative method of stereo image separation is so-called "alternate eye" in which left eye and corresponding right eye images are projected alternately and viewers wear glasses having lenses that are alternately transmissive and non-transmissive in synchronism with the projected images. Again, the viewer's left eye sees only projected left-eye images and the viewer's right eye sees only projected right-eye images. Typically, electro-optic liquid crystal cells are used as the lenses in the glasses.

In motion picture theatres, there is a demand for variety in programming. Projector installations should be capable of allowing quick interchange between different films and films of different formats.

A 3-D IMAX™ theatre installation typically has two projectors, which are used together to show 3-D films or either of which can be used to show 2-D films. However, such an installation obviously requires the capital cost and maintenance cost of two projectors.

A dual rotor rolling loop projector is disclosed in U.S. Pat. No. 4,966,454 (Toporkiewicz) and can be run either with two filmstrips as a 3-D projector or a single filmstrip as a 2-D projector. However, such a projector is relatively complex and costly.

An object of the present invention is to provide a less complex form of rolling loop projector that is convertible for showing 2-D or 3-D films.

SUMMARY OF THE INVENTION

The projector provided by the present invention has a rolling loop film transport mechanism including a stator, a rotor which is rotatable with respect to the stator, the rotor and stator defining a film path, and the rotor having gaps in which loops of film are progressively formed and the decay as the rotor rotates, for advancing the film in defined incremental amounts past an aperture location. Means is provided at the aperture location defining a central aperture against which successive frames of a 2-D film can be registered as the film is advanced through said defined incremental amounts, and a pair of 3-D apertures on respectively opposite sides of the central aperture against which frames of a 3-D film carrying respective left- and right-eye images can be registered. The 3-D apertures are dimensioned and located with respect to the central aperture so that successive pairs of 3-D frames can be registered with the 3-D apertures as the 3-D film is advanced by rotation of the rotor through the same incremental amount as a 2-D film is advanced. Projection lens means is associated with the apertures and is adapted to produce projected images selectively either from a 2-D film projected through the central aperture or from a 3-D film projected through the 3-D apertures. The projector also includes projection lamp means convertible for projecting a single beam through the central aperture or two beams through the 3-D apertures.

In other words, the invention provides what is essentially a "standard" 2-D rolling loop film projector that can run either a standard 2-D filmstrip or a 3-D filmstrip. Since the rolling loop mechanism of the projector will advance the film through the same incremental amount irrespective of the images on the filmstrip, a specially prepared filmstrip must be used for 3-D image presentation. Preferably, the 3-D images are anamorphically compressed by a factor of two in the direction of film travel as compared with a standard 2-D image. In other words, two 3-D images fit into the same area of the film as a single 2-D image. The images must also be separated in the direction of film travel by a distance equal to the length of a normal 2-D format image.

For example, in the art, the length of the film image (in the direction of film travel) is normally referred to in terms of the number of marginal perforations in the film that correspond to the length of one image, e.g. "15 perf". Accordingly, if 15 perf is the normal length of a 2-D image, the 3-D images will be anamorphically compressed to occupy a space of 7.5 perf and the images will be separated from one another by 15 perf. As the film is advanced at each increment, successive images on the filmstrip will be brought into register with the relevant aperture or apertures, whether the film is a 2-D film or a 3-D film.

The projection lens means of the projector will then be optically designed to decompress the 3-D images so that the projected images will be of comparable size whether 2-D or 3-D images are being projected.

Anamorphic compression of the 3-D images can be accomplished using optical printing techniques in preparing the film. Some re-arrangement of the sequence of the images on the filmstrip will also have to be undertaken during printing, as compared with the "natural" sequence in which the images will be captured in shooting a film.

BRIEF DESCRIPTION OF THE DRAWINGS

In order that the invention may be more clearly understood, reference will now be made to the accompanying drawings which illustrate a particular preferred embodiment of the invention by way of example, and in which.

DESCRIPTION OF PREFERRED EMBODIMENT

Figures 1A, 1B:
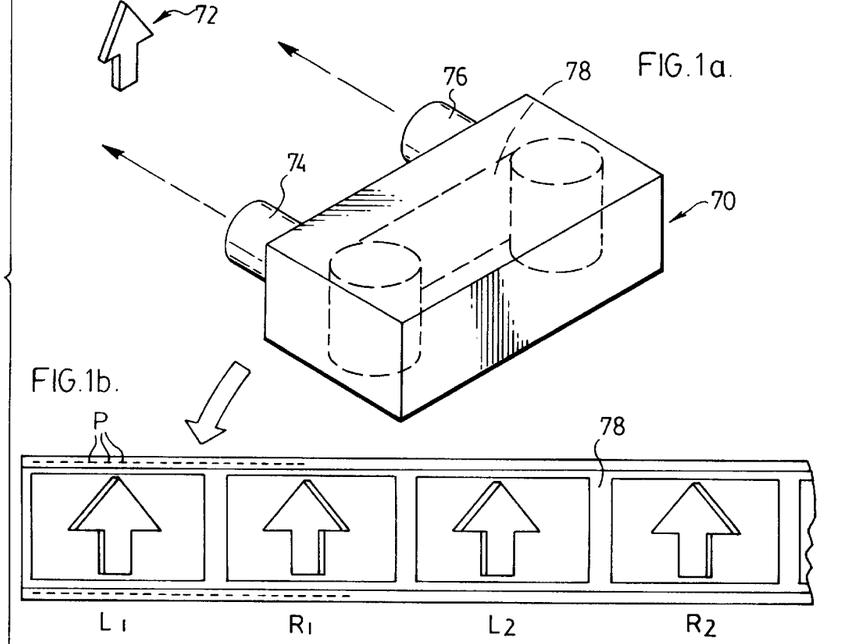
FIG. 1 comprises three schematic views denoted (a), (b) and (c) illustrating the steps in making a 3-D filmstrip for use in the projector of the invention.
Figure 1C:
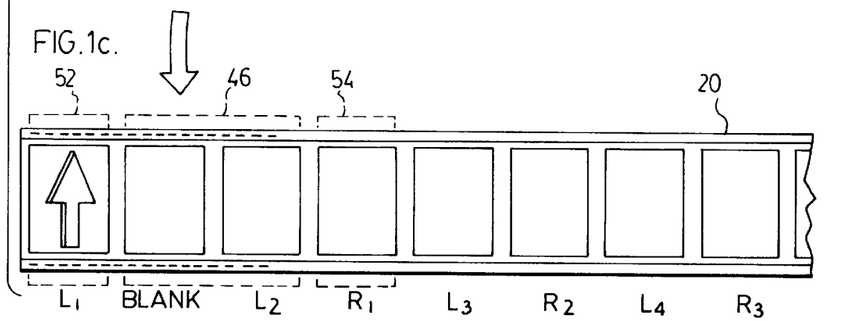
Figure 2:
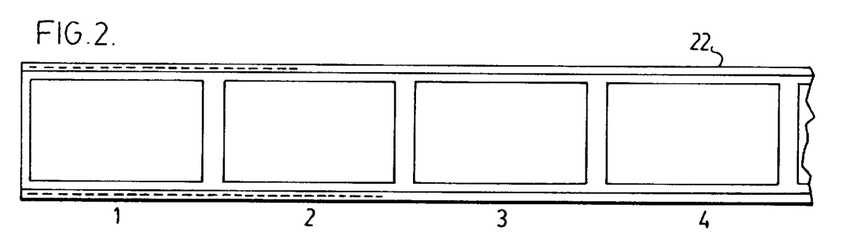
FIG. 2 shows a corresponding 2-D image filmstrip.
Figure 3:
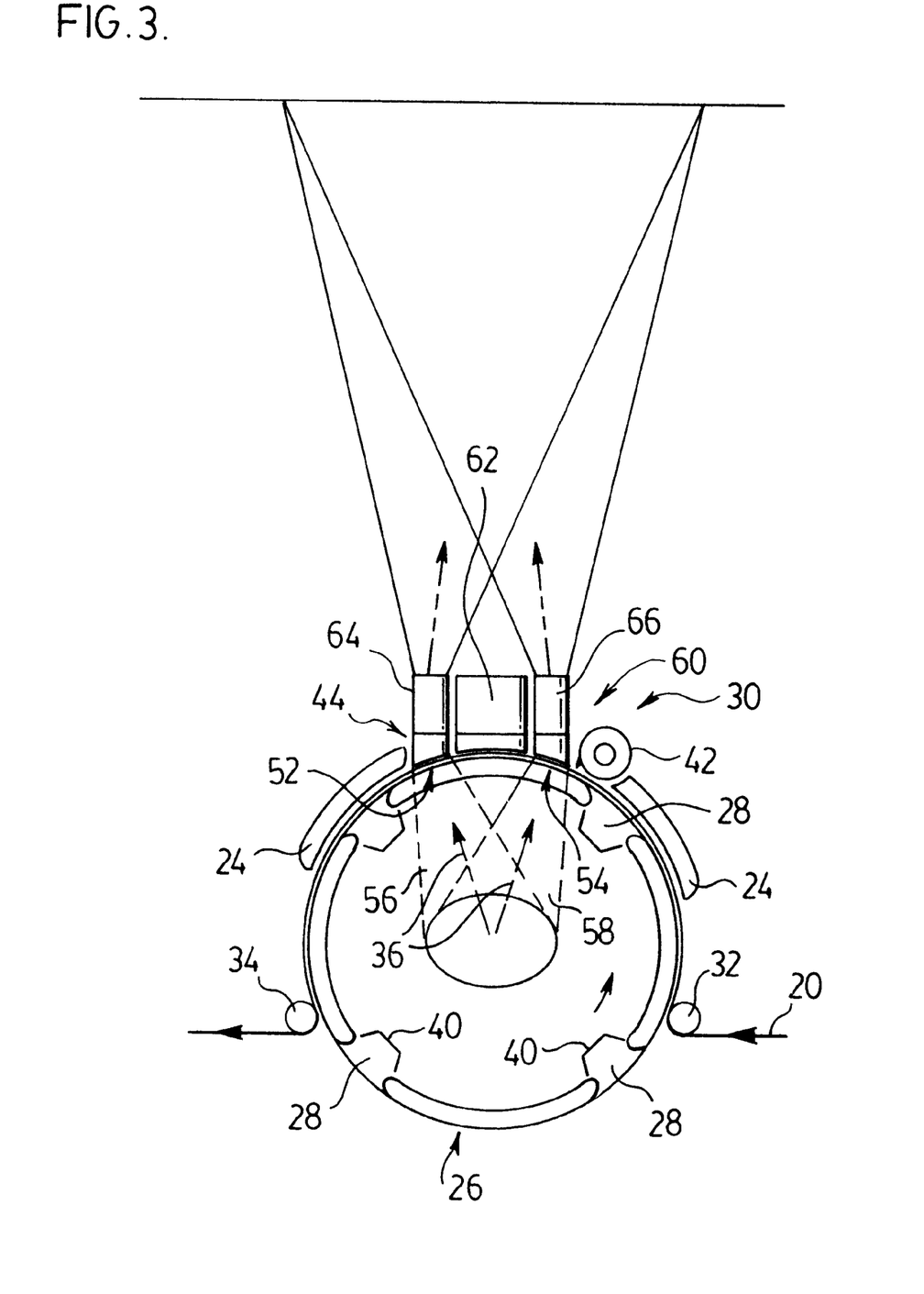
FIGS. 3 and 4 are diagrammatic plan views of a rolling loop projector in accordance with the invention.
Figure 4:
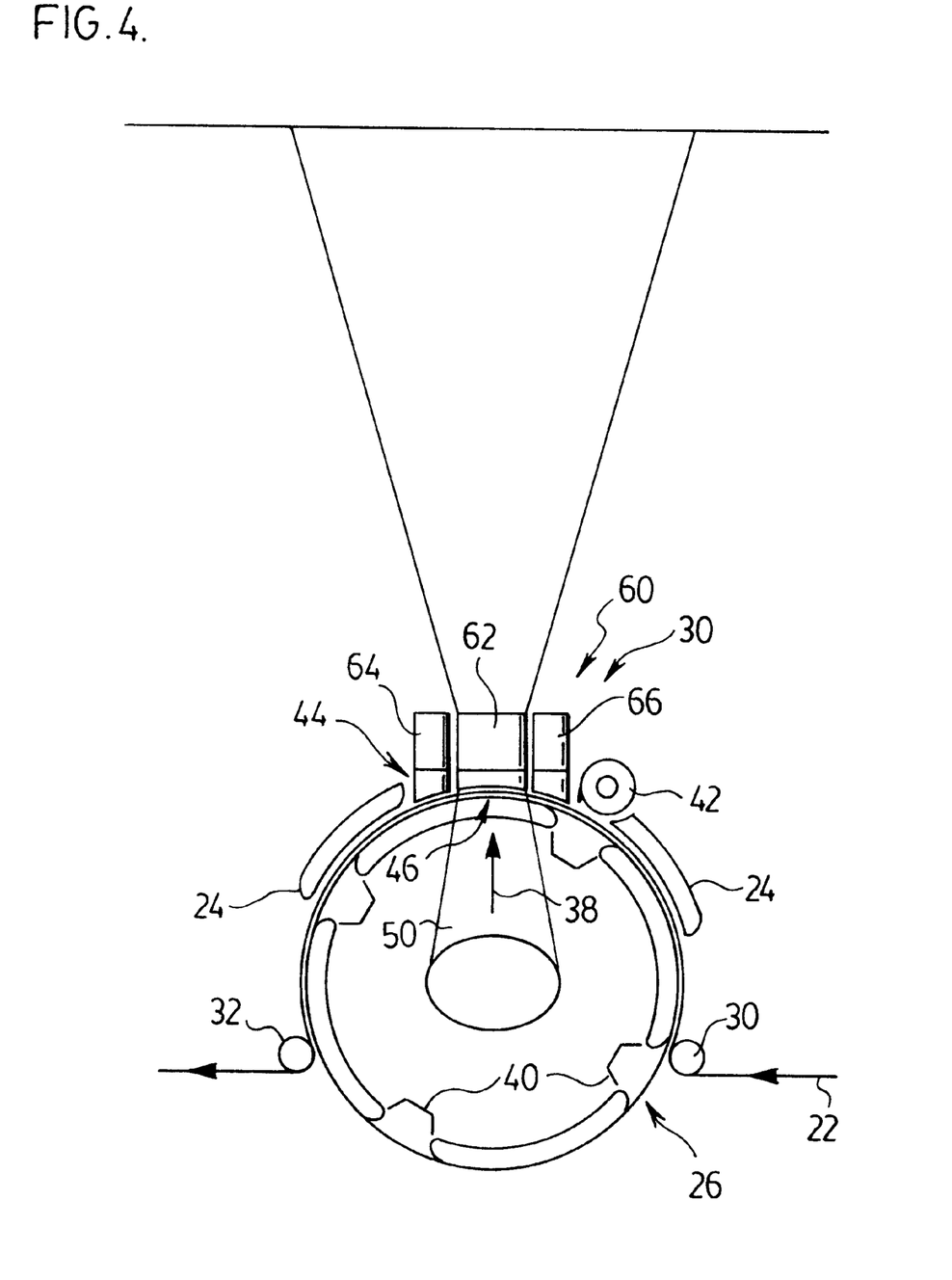

Central to this embodiment of the present invention is the technique illustrated in FIG. 1 for producing successive pairs of alternating left-eye and right-eye stereoscopic images on a single filmstrip. The image format on the filmstrip is shown in FIG. 1(c) where the filmstrip itself is denoted by reference numeral 20. FIG. 2 shows a comparable 2-D filmstrip 22 for use in the projector of the invention. Before describing to FIGS. 1 and 2, however, it may be helpful to briefly refer to FIGS. 3 and 4 which show diagrammatically and in plan, the principal components of the projector for projecting filmstrip 20 or 22. FIG. 3 shows the projector configured for 3-D image presentation while FIG. 4 shows the projector configured to project 2-D images.

The projector has a rolling loop film transport mechanism of the general type described in the Jones and Shaw patents referred to supra. The mechanism includes a stator 24 and a rotor 26 which is rotatable with respect to the stator. The rotor and stator co-operate to define a film path. In FIG. 3, the 3-D filmstrip 20 is shown in the film path while in FIG. 4 the 2-D filmstrip 22 is shown in the path. The rotor has gaps 28 in which loops of film are progressively formed and then decay as the rotor rotates for advancing film in defined increments past an aperture location generally denoted 30. Input and output sprockets for feeding the film into the film path and withdrawing it from the film path respectively are indicated at 32 and 34.

For clarity of illustration, film loops have not been shown in the gaps in the rotor; reference may be had to the Jones and Shaw patents for a detailed description of the rotor structure. Suffice it to say that light can pass outwardly through the rotor as generally indicated by the arrows 36 in FIG. 3 and 38 in FIG. 4 in the areas between the rotor gaps 28. Shutters 40 are provided across the gaps so that light is obstructed when the shutters pass through the projected light beams. Similar so-called "flicker" shutters can be provided between the gaps to provide an acceptable flicker rate. Again for ease of illustration, only four rotor gaps are shown in FIGS. 3 and 4 although in practice a larger number of gaps normally will be provided (e.g. 12). A cam unit for decelerating the film as it approaches the aperture location is indicated at 42.

Outwardly of the rotor at the aperture location 30 is an aperture block assembly generally denoted 44. The aperture block assembly is shown in detail in FIGS. 11 to 16 which will be described later. The aperture block assembly provides a single central aperture indicated at 46 in FIG. 4 at which successive frames of 2-D film 22 can be registered as the film is advanced by rotation of the rotor. A light beam projected from a projection lamp 48 (FIGS. 5 and 6) is shown in FIG. 4 at 50 and is directed through aperture 46 and film 22.

On opposite sides of aperture 46 are a pair of 3-D apertures 52, 54 (FIG. 3), against which frames of a 3-D film carrying respective left- and right-eye images can be registered. The 3-D apertures 52, 54 are located with respect to the central aperture so that successive pairs of 3-D frames can be registered with the 3-D apertures as the film is advanced by rotation of the rotor 26. As noted previously, the rotor advances the film through the same incremental amount whether a 2-D film or a 3-D film is being projected. Accordingly, the images must be appropriately arranged on the filmstrip 20 (FIG. 1(c)) to ensure proper registration with the apertures 52, 54 and the spacing between successive pairs of apertures must be equal to the film advance increment, i.e. the length of a single normal 2-D image.

As will be described in more detail in connection with FIGS. 1 and 2, in order to achieve the required image format on the film, the 3-D images are anamorphically compressed in the direction of film travel by a factor of 2 as compared with the 2-D images.

Figure 5:
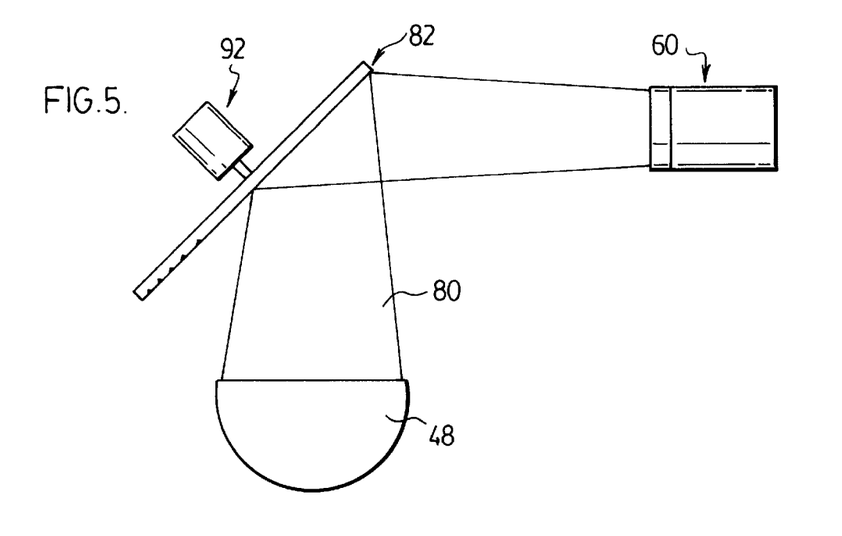
FIGS. 5 and 6 are diagrammatic side elevational views showing the projection lamp and light path for the projector.
Figure 6:
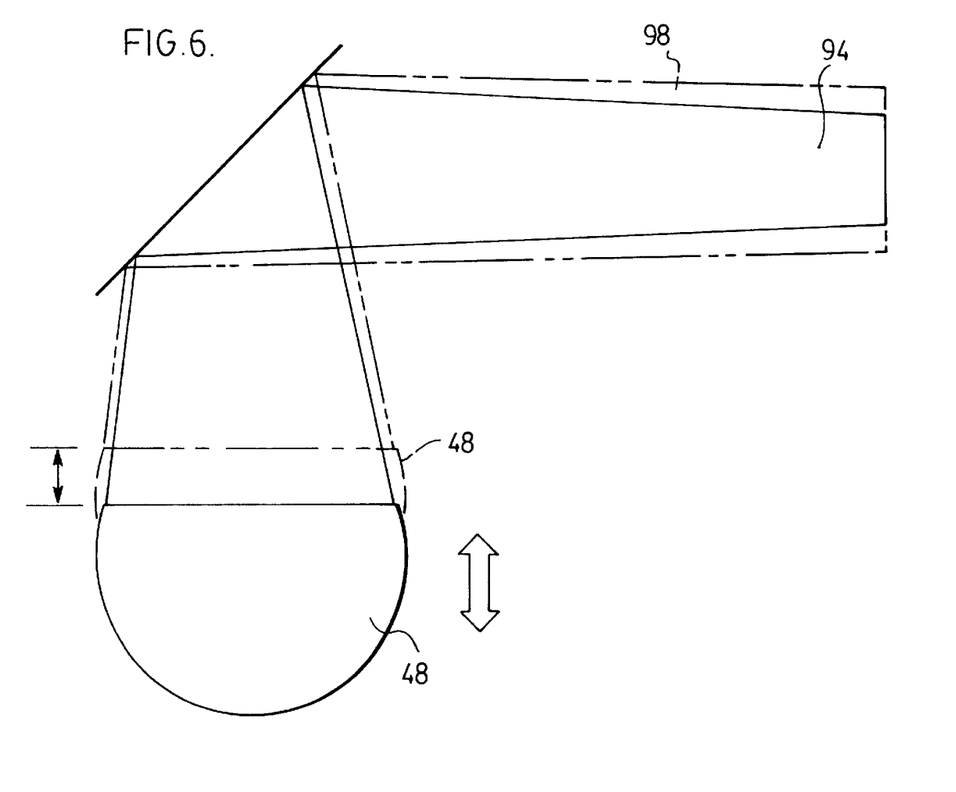

Respective light beams 56 and 58 for the two 3-D images are shown in FIG. 3 emanating from the projection lamp 48 (FIGS. 5 and 6). Outwardly of the aperture block assembly 44 is a projection lens assembly 60 that includes a single central lens 62 for the 2-D images (see FIG. 4) and two outer lenses 64 and 66 for the 3-D images. These lenses are optically designed to decompress the anamorphically compressed images on the filmstrip 20 so that the images that appear on the screen are normal uncompressed images of comparable size to the images that are projected through the central lens 62. from the 2-D filmstrip 22.

Reverting to FIG. 1, the 3-D filmstrip 20 and the method by which it made will now be described. FIG. 1(a) shows diagrammatically at 70 a 3-D camera that is used to record successive left-eye and right-eye images of an object 72. The camera has left-eye and right-eye lenses 74 and 76 through which left-eye and right-eye views respectively of the object are recorded on a filmstrip 78. FIG. 1(b) shows the images as they appear on the filmstrip 78. The first pair of images $L_1$ and $R_1$ appear adjacent to one another and are followed by a second pair of images $L_2$ and $R_2$, and so on. Typically, each image will occupy a length of the filmstrip (in the direction of film advance) equal to 15 of the marginal perforations P on the filmstrip. FIG. 2 shows a typical 2-D filmstrip with normal sequential "15 perf" images numbered 1, 2, 3 and 4.

FIG. 1(c) shows the final 3-D filmstrip 20 that is used in the projector. The images that are recorded in the camera 70 on filmstrip 78 (FIG. 1(b)) are converted into the format shown in FIG. 1(c) by an optical printing technique performed in a conventional optical printer fitted with an anamorphic lens assembly that horizontally compresses the images by a factor of 2 so that each of the images on filmstrip 20 occupies a length of only 7.5 perfs. In order to provide for proper sequencing of the images on the filmstrip, the images must also be interlaced to produce the sequence shown in FIG. 1(c). The printer has a film movement which is set to produce the required interlacing. The movement involves two sequential operations, a 22.5 perf advance (to record the second image of the image pair after the first image of that pair has been recorded) followed by a 7.5 perf retreat (to record the first eye image of the next image pair).

In FIG. 1(c) the dotted outlines denoted 52 and 54 represent the two 3-D apertures 52 and 54 referred to previously in connection with FIG. 3 and outline 46 represents the central 2-D image aperture. It will be seen that the image sequence on the filmstrip allows the left-eye image of the first pair to be in register with aperture 52 at the same time as the right-eye image of that pair is in register with aperture 54. Also, the area between the $L_1$ and $R_1$ images is of a length equal to the length of a normal 15 perf 2-D image. The film advance mechanism of the projector moves the film through the length of one normal 2-D image (15 perfs) at each increment. When the film advances (to the left) from the position shown in FIG. 1(c), the left-eye image $L_2$ of the second pair is brought into register with aperture 52 and the right-eye image $R_2$ of that pair into register with aperture 54. Subsequent frame pairs similarly register with the respective apertures as the film is advanced.

Figure 7:
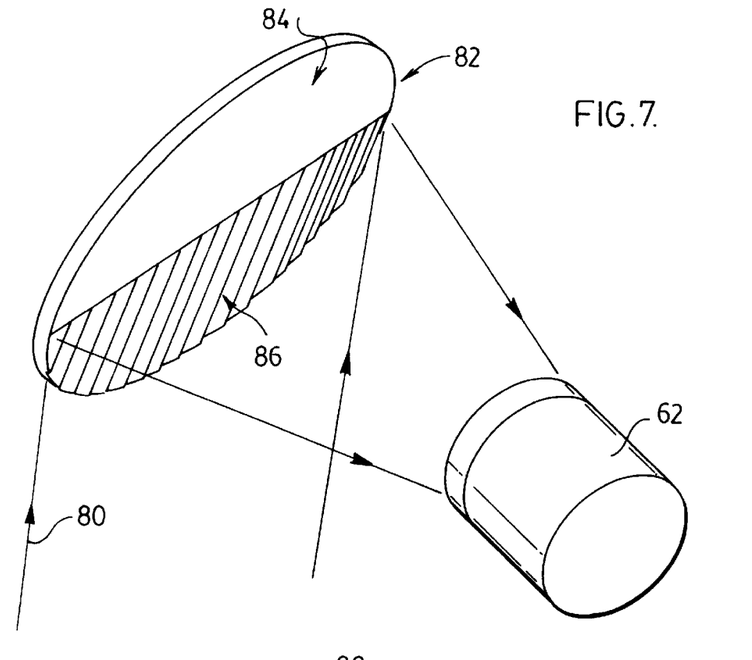
FIGS. 7 and 8 are diagrammatic perspective views showing the projection lenses and associated light beams.
Figure 8:
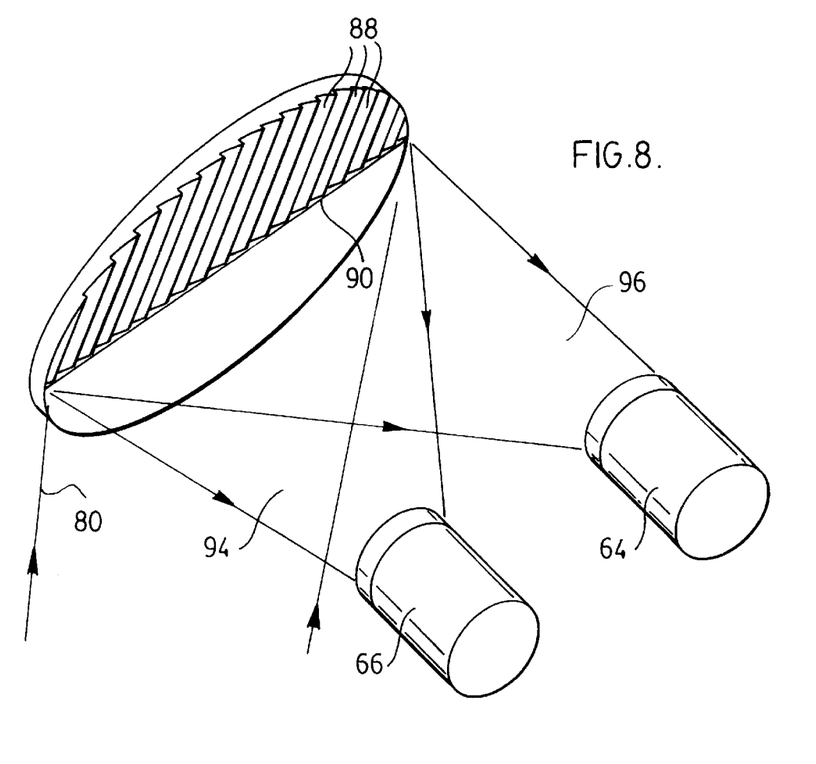

FIGS. 5 and 6 show diagrammatically the projection lamp means of the projector of FIGS. 3 and 4 and, in conjunction with FIGS. 7 and 8, illustrate how the projection lamp means is convertible for projecting a single beam through the central aperture 46 or two beams through the 3-D apertures 52 and 54.

FIG. 5 shows the projection lamp 48 and illustrates the fact that the lamp is positioned to project a light beam 80 upwardly towards a mirror 82 by which the beam is then reflected forwardly to the projection lens assembly 60. For clarity of illustration, only these components have been shown.

As seen in FIGS. 7 and 8, mirror 82 is circular and has two distinct semi-circular surface portions 84 and 86, one (84) of which is plane, while the other (86) is defined by a series of parallel ridges 88 that extend normal to the diametral line 90 at which the two surface portions 84 and 86 meet. Reverting to FIG. 5, it will be seen that the mirror is designed to be turned about its centrepoint by an electric servo-motor 92 so that either the plane surface portion 84 of the mirror or the ridged surface portion 86 can be moved into the path of the light beam 80 from lamp 48.

When a 2-D film is to be projected, the plane surface portion 84 of the mirror is positioned in light beam 80 so that a single beam of light is reflected from mirror 82 to the 2-D projection lens 62 as shown in FIG. 7. When a 3-D film is to be projected, mirror 82 is turned to bring its ridged surface portion 86 into the path of light beam 80. Referring to FIG. 8, each of the ridges 88 is precision formed in surface portion 86 of mirror 82 so that the light beam 80 that is incident on the mirror from projection lamp 48 is split into two distinct beams 94 and 96 as the light is reflected off the mirror, and the respective beams are directed to the left and right hand projection lenses 64 and 66 of the projector, for projecting the left- and right-hand image pair on film 20. As mentioned previously, the lenses 64 and 66 are different from lens 62 in that they are engineered to anamorphically decompress the images so that the images appear at normal size on the projection screen. Alternate projection of the images is achieved by appropriate timing of the shutters 40 of the projector, in known manner.

Since the 3-D images on film 20 (FIG. 1(c)) are narrower than the corresponding 2-D images on film 22 (FIG. 2), it is desirable to use a narrower light beam for projecting the 3-D images, in order to maximize transmission of available light. Accordingly, the projector also includes provision for vertical movement of the projection lamp 48 as illustrated in FIG. 6, between an upper position for 2-D projection, and a lower position for 3-D projection. FIG. 6 shows the projection lamp in full lines in its lower position for 3-D projection and in chain-dotted lines in an upper position for 2-D projection. Reference numeral 98 denotes the larger beam that is achieved in the upper position for 2-D projection, while reference numeral 94 indicates one of the two narrower beams required for 3-D projection.

The required vertical movement of lamp 48 can be achieved by any convenient mechanical means. For example, the projection lamp could be supported by a carriage that is mounted for vertical movement in guides by means of a rack and pinion arrangement under the control of an electric servo-motor.

Figure 9A:
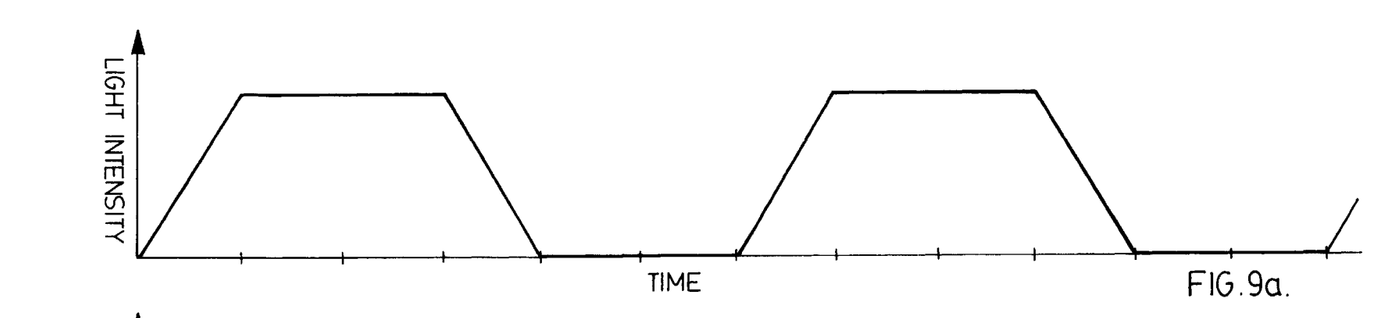
FIG. 9 comprises diagrams denoted (a) and (b) showing respectively the shutter timing for left- and right-eye projection of 3-D images respectively.
Figure 9B:
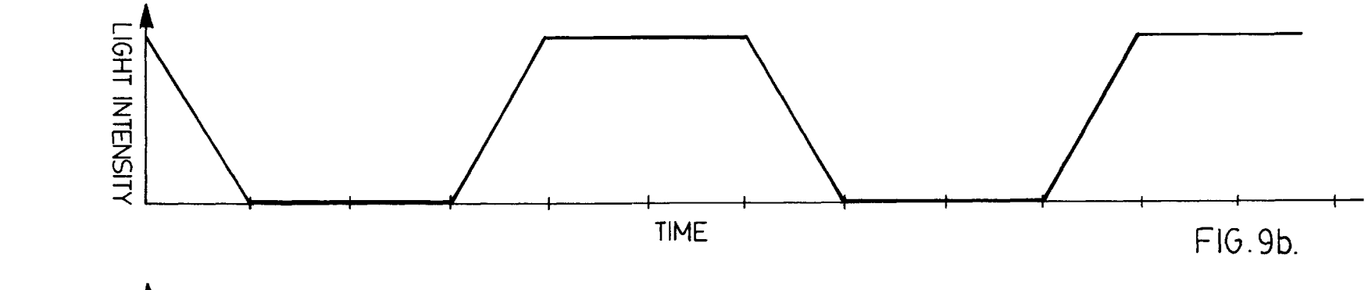
Figure 10:
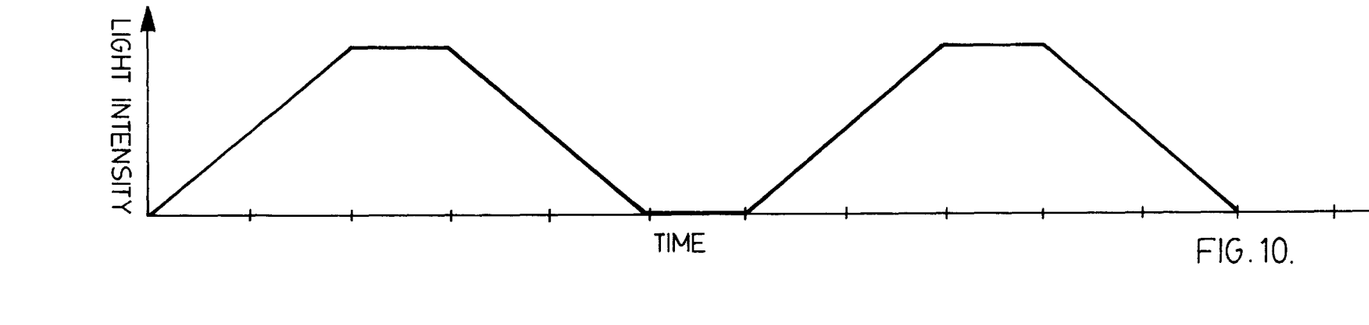
FIG. 10 is a corresponding timing diagram for projection of 2-D images.

FIGS. 9 and 10 show timing diagrams respectively for 3-D image projection and 2-D image projection. The horizontal (X) axis represents time while the vertical (Y) axis indicates the intensity of the projected light. The respective axes are shown to the same scale in both views. In FIG. 9, the diagram denoted (a) shows the left-eye light while the diagram indicated (b) shows the right-eye light.

While it would be possible to operate the projector of the invention using polarizers for separating the left-eye and right-eye images, the preferred approach is to use the alternate eye technique referred to previously. This is illustrated by comparing FIGS. 9(a) and (b). It will be seen, for example, that the light intensity for the left-eye image (FIG. 9(a)) rises to a maximum level at which it continues before falling off rapidly, at the same time as the intensity of light for the corresponding right-eye image begins to increase from zero. In other words, only one image is on the screen at any one time. This is achieved by the timing of the shutters 40 carried by the rotor of the projector.

FIG. 10 shows a single and similar but more elongated profile for the light that passes through the central aperture 46 during 2-D projection and occurs because the 2-D aperture 46 is longer in the direction of film travel than the 3-D apertures 52 and 54.

FIGS. 11 to 16 show in some detail the aperture block assembly 44 referred to in connection with FIGS. 3 and 4, as seen from the rotor side, i.e. looking towards the screen. The film path is denoted F (film 20 or 22), and the projection lenses are indicated at 62 (2-D lens) and 64 and 66 (3-D lenses). The path of the film F remains the same whichever film is projected but the projection lenses move vertically depending on which film is being used, as will be described.

The aperture block assembly has a fixed base or frame 100 and includes a carriage 102 that is vertically movable in the frame 100 under the control of an air cylinder 104. The projection lenses 62, 64 and 66 are secured to and move with carriage 102.

Figure 11:
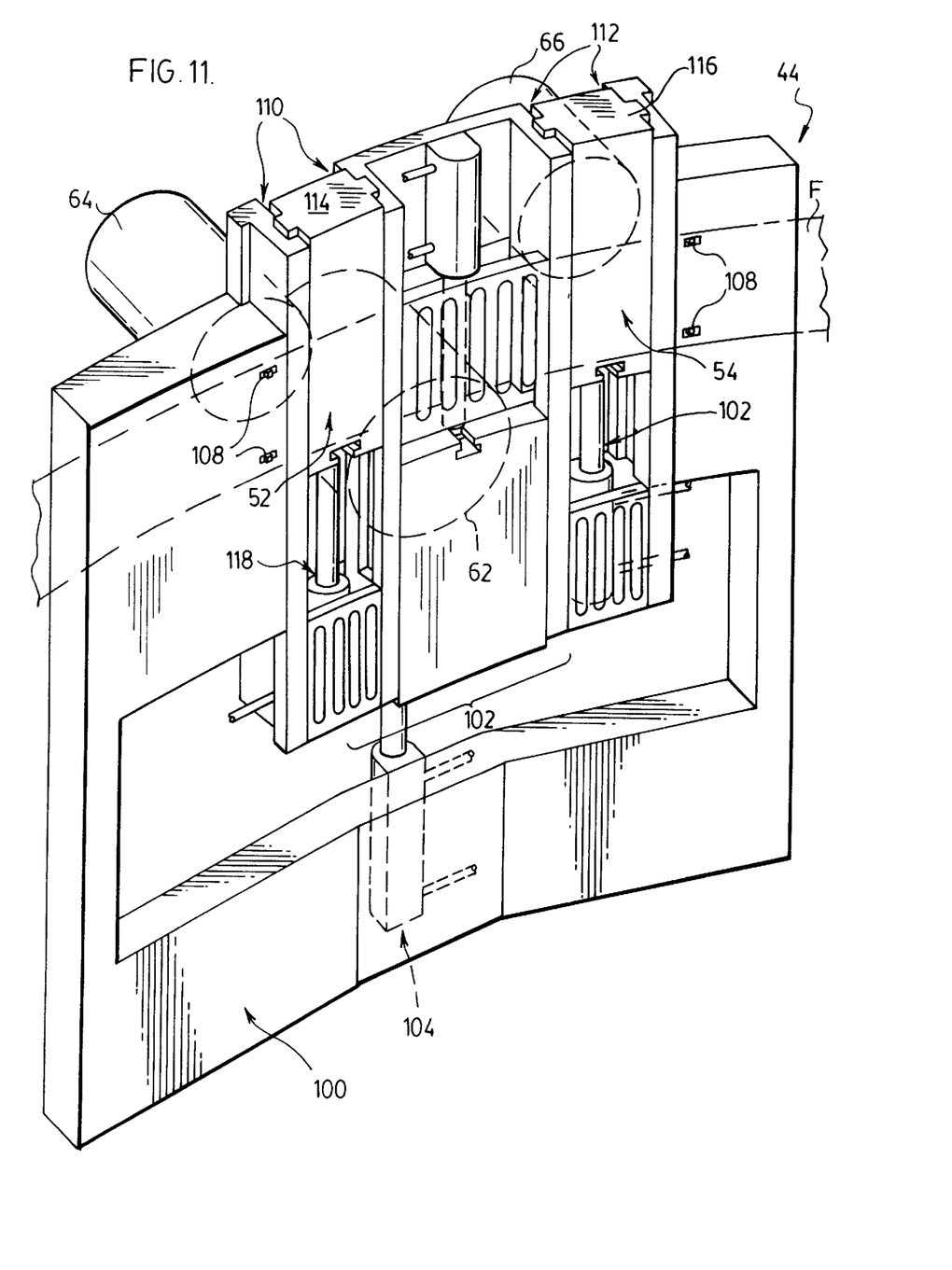
FIG. 11 a perspective view from the rotor side of the aperture block assembly of the projector.

Sets of register pins for engaging the perforations in the film are shown on frame 100 on opposite sides of the carriage in the film path and are denoted 106 and 108 respectively. As shown in FIG. 11, the carriage 102 is in a position for projecting 3-D images and the left and right 3-D apertures are represented at 52 and 54 respectively. The apertures are in fact defined laterally (in the direction of film travel) by two guideways 110 and 112 respectively in the carriage, each of which receives a so-called "field flattener" lens element, the two elements being denoted respectively 114 and 116. As successive image pairs are brought into position for projection by rotation of the rotor, the image portions of the film are laid onto the inner surfaces of the lens elements 114, 116. The vertical limits of the respective apertures are defined by the cone of light from projection lamp 48.

Each of the field flattener lens elements 114, 116 is vertically slidable in its respective guideway 110, 112 under the control of an associated air cylinder, 118 or 120, so that "clean" portions of the lens element surface can periodically be brought into position for engagement by the film, and any debris that has accumulated on the lens element is moved aside. Reference may be made to U.S. Pat. Nos. 4,365,877 and 4,441,796 (Shaw) for a detailed description of displaceable field flattener lens elements of this type. The disclosures of the Shaw patents are incorporated herein by reference.

Figure 12:
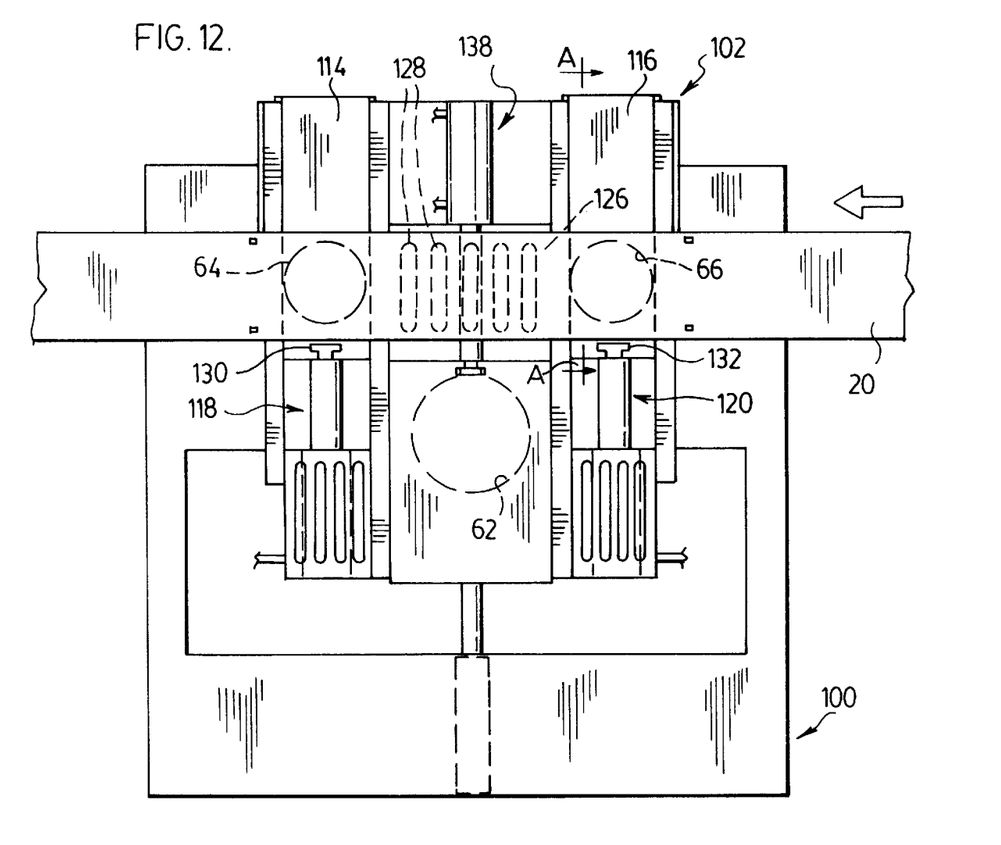
FIG. 12 is an elevational view corresponding to FIG. 9 showing a 3-D filmstrip in position for projection.
Figure 13:
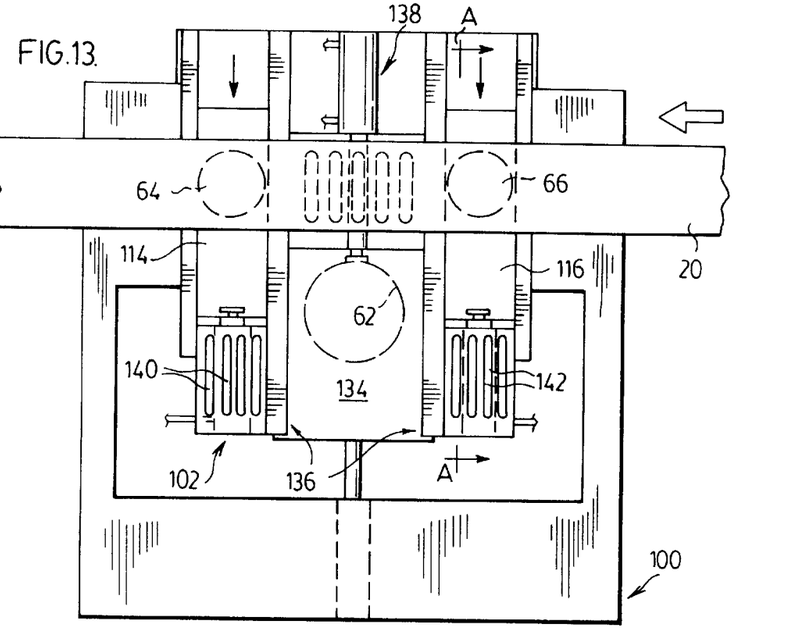
FIG. 13 is a view similar to FIG. 10 showing an alternative position of the assembly shown in FIG. 10.
Figure 16A:
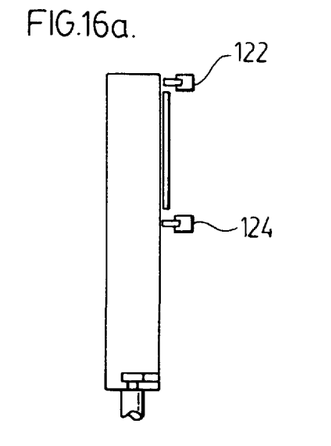
FIG. 16 comprises sectional views denoted (a) and (b) taken along lines A—A in FIGS. 11 and 12 respectively.
Figure 16B:
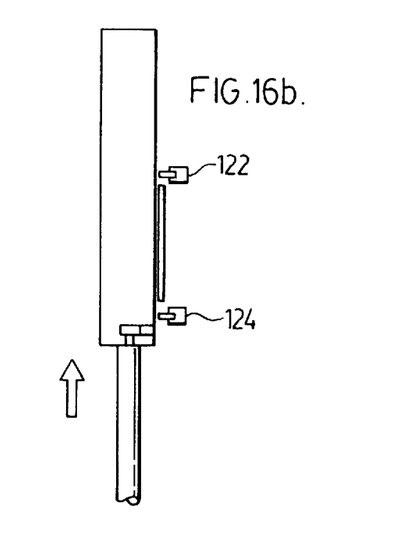

FIG. 12 shows the carriage 102 and the lens elements 114 and 116 in the positions in which they are shown in FIG. 11, for projecting a 3-D film 20. FIG. 13 is a similar view but showing the two lens elements 114 and 116 having been moved down to bring a "clean" portion of the lens element surface into position for contact by the film. FIG. 16 shows corresponding sectional views on lines A—A of FIGS. 12 and 13. Wiper blade elements 122 and 124 are shown above and below the film respectively for cleaning the lens element surfaces in accordance with the teachings of the '877 and '796 Shaw patents.

FIGS. 12 and 13 also show that the carriage includes, between the two apertures (represented in this view by outlines of the projection lenses 64 and 66), a fixed plate 126 (see also FIG. 11) which forms part of the carriage and across which the film is laid during projection. Formed in the plate are a series of vertical slots 128 comprising vacuum ports, for holding the film flat against the lens elements 114, 116 during projection.

FIG. 12 also shows T slots 130 and 132 that are provided in the bottom faces of the respective lens elements 114 and 116 and are engaged by complimentary formations on the respective air cylinders 118 and 120 so that the lens elements can readily be disconnected from the air cylinders and changed (when the film is not present).

Figure 14:
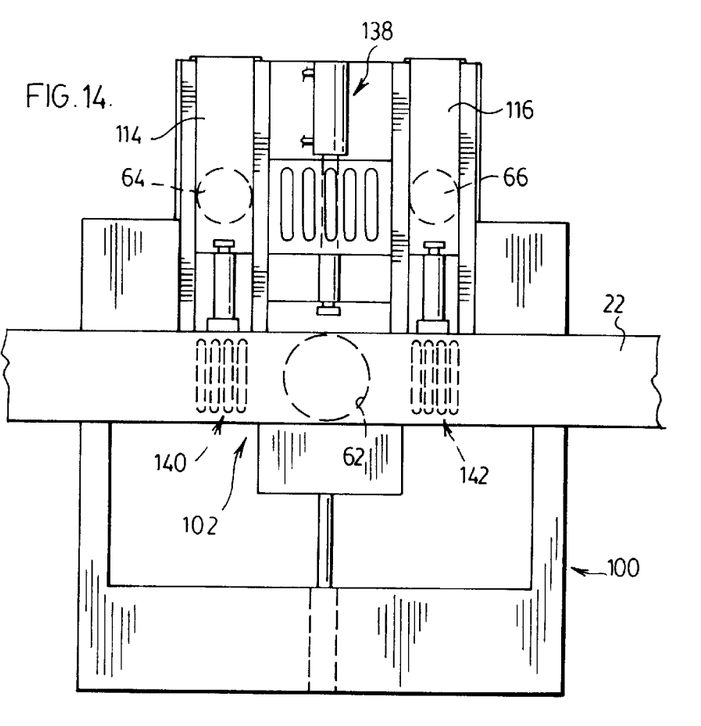
FIG. 14 is a view similar to FIG. 10 but showing the assembly in position for projection of a 2-D filmstrip.
Figure 15:
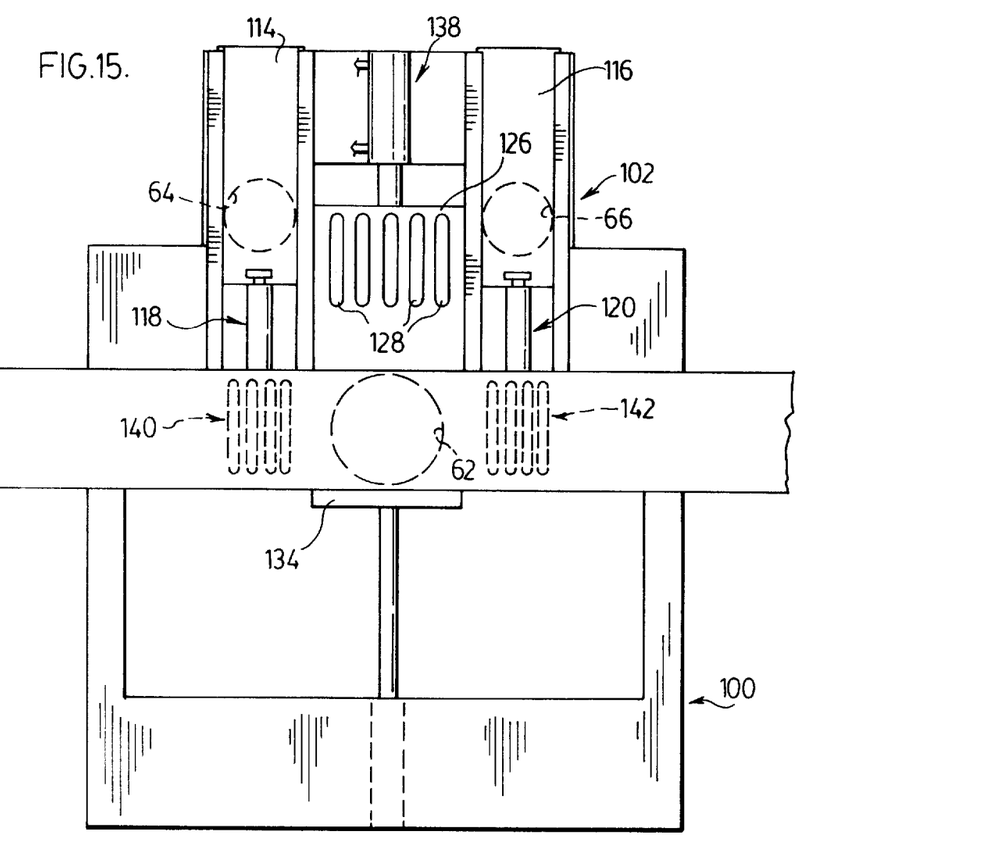
FIG. 15 is a view similar to FIG. 12 showing an alternative position of the assembly.

FIGS. 14 and 15 show carriage 102 as having been moved to an upper position as compared with the position shown in FIGS. 11, 12 and 13 so that the 2-D projection lens 62 is positioned in the film path, for projecting 2-D images. In other words, FIGS. 14 and 15 show the position of the carriage 102 for projecting a 2-D film. Again, a field flattener lens element assembly (denoted 134) is mounted in a guideway 136 in carriage 102 so that the film is laid onto the inner surface of the lens element during projection. This lens element is also vertically movable for cleaning and may have associated wipers (not shown). In this case, an air cylinder 138 is mounted above the lens element and the lens element is coupled to the air cylinder by a T-shaped coupling arrangement similar to that described in connection with the lens elements 114 and 116. FIG. 15 shows the lens element 134 as having been moved up with respect to its position in FIG. 14, for cleaning.

Respective series of vacuum ports 140, 142 are provided in carriage 102 on opposite sides of lens element 134, for holding the film flat against the inner surface of that element during projection.

In summary, the invention provides a projector that is quickly and easily convertible for showing either a 2-D film or a 3-D film without the cost, complexity or maintenance requirements for using two projectors for 3-D projection, or of a double-rotor projector.

It will of course be appreciated that the preceding description relates to a particular preferred embodiment of the invention and that many modifications are possible.

In most applications, anamorphic compression of the 3-D images, and subsequent decompression during projection will be required. The projected images will then appear as of comparable size to an audience, whethe 2-D or 3-D. However, it is conceivable that such anamorphic compression and decompression may not be essential, for example, if a special effect is required.

Similarly, it would be possible to use separate light sources for 2-D and 3-D image projection, although it is preferred to use a single light source and a special mirror to produce either a single beam of light for 2-D image projection or two beams of light for 3-D projection. The mirror that is used to achieve this effect could be designed as in the preferred embodiment, although different mirror surface configurations are possible. For example, individual mirror facets could be used to split the incident light into two beams, rather than the ridged arrangement described. The mirror could be moved linearly rather than rotationally to bring different surface portions of the mirror into the path of the light.

Similarly, movement of the lamp towards and away from the mirror, while preferred, is not essential.

Finally, the particular design of the aperture block assembly shown in FIGS. 11 to 16 is preferred but not essential. A simple fixed assembly with immoveable field flattener lens elements could be used where accumulation of debris is not a concern. The arrangement described is, however, preferred because it not only provides for cleaning of the lens element assemblies but also allows for incorporation into the aperture block assembly of suction ports for holding the film against the lens elements.

What is claimed is:

1. A motion picture projector convertible for projecting images either from a 2-D film strip or from a 3-D film strip, the projector having a rolling loop film transport mechanism including a stator, and a rotor, which is rotatable with respect to the stator, the rotor and the stator defining a film path and the rotor having gaps in which loops of film are progressively formed and then decay as the rotor rotates for advancing the film in defined incremental amounts past an aperture location; the projector further comprising:

means at said aperture location defining a central aperture against which successive frames of a 2-D film can be registered as the film is advanced through said incremental amounts, and a pair of 3-D apertures on respectively opposite sides of the central aperture against which frames of a 3-D film carrying respective left-eye and right-eye images can be registered, the 3-D apertures being dimensioned and located with respect to the central aperture so that successive pairs of 3-D frames can be registered with the 3-D apertures as the 3-D film is advanced by rotation of the rotor through the same said incremental amount;

projection lens means associated with the apertures and adapted to produce projected images either from a 2-D film projected through the central aperture or from a 3-D film projected through the 3-D apertures; and, projection lamp means convertible for projecting a single beam through the central aperture or two beams through the 3-D apertures.

2. A projector as claimed in claim 1, for use in combination with a 3-D film having images that are anamorphically compressed by a factor of two in the direction of the length of the film in preparing the film, and wherein the projection lens means is adapted to decompress said anamorphically compressed 3-D images so that decompressed images are projected through said central aperture.

3. A projector as claimed in claim 1, wherein said projection lamp means includes a lamp and a mirror for reflecting light to said apertures, wherein the mirror has a first surface portion and a second surface portion and is displaceable to bring either of said surface portions selectively into the path of light from said projection lamp, said first mirror surface portion being shaped to reflect a single beam of light to said central aperture for projection of a 2-D film, and said second surface portion of the mirror being contoured to reflect light in two beams that are directed to the respective 3-D apertures.

4. A projector as claimed in claim 3, wherein said mirror is circular and said first and second surface portions of the mirror comprise semi-circular surface portions that meet at a diametral line extending through a centre of the mirror, and wherein the mirror is displaceable by turning about said centre.

5. A projector as claimed in claim 3, wherein the projection lamp is displaceable towards and away from said mirror between an outer position for reflecting a beam of light from said first surface portion of the mirror to said central aperture, and an inner position closer to the mirror for reflecting two narrower beams of light from said second surface portion of the mirror to said 3-D apertures.

6. A projector as claimed in claim 1, which includes an aperture block assembly at said aperture location, including a central field flattener lens element that defines said central 2-D aperture, and two field flattener lens elements on opposite sides of said central element that define said 3-D apertures, the field flattener lens elements having respective inner surfaces against which successive portions of a film to be projected are laid as the film is advanced.

7. A projector as claimed in claim 6, wherein each said lens element is vertically displaceable with respect to a defined film path through the aperture block assembly, to bring into said film path a fresh portion of said inner surface of the element into position for contact by the film.

8. A projector as claimed in claim 7, further comprising, in association with each said field flattener lens element, respective wiper elements extending transversely of said inner surface of the field flattener lens element, for removing debris from said surface as the element is displaced to bring a fresh surface portion of the lens element into the film path.

9. A projector as claimed in claim 6, wherein said projection lens means includes a 2-D projection lens and respective left-eye and right-eye 3-D projection lenses, and wherein the aperture block assembly includes a frame and a carriage which includes said field flattener lenses elements defining said apertures, said projection lenses being aligned with the respective field flattener lens elements and being coupled to the carriage so that the 3-D lenses are horizontally aligned with one another and vertically separated from the 2-D lens, wherein the carriage is vertically displaceable selectively to bring either said 3-D lenses or said 3-D lens into register with the said film path, the carriage further including respective vacuum ports for holding a film against the inner surface of the relevant lens element assembly and comprising a single series of said ports disposed between said 3-D lenses for holding a 3-D film against the 3-D film flattener lens elements when the 3-D lenses are in said film path, and two series of said vacuum ports disposed on respectively opposite sides of said 2-D lens for holding a 2-D film against the 2-D film flattener lens element assembly when the 2-D lens is in the film path.

10. A projector as claimed in claim 9, wherein said each of said field flattener lens elements has a length in a direction normal to said film path greater than twice the height of the film, and wherein the lens element is vertically displaceable with respect to the film path so that a fresh portion of said inner surface of the lens element outside the film path can be brought into the film path for removing accumulated debris.

* * * * *